United States Patent [19]

Park

[11] Patent Number: 5,335,080
[45] Date of Patent: Aug. 2, 1994

[54] APPARATUS AND METHOD FOR GENERATING VIDEO PICTURE ADJUSTMENT SIGNALS IN VCR

[75] Inventor: Seung C. Park, Kyungki, Rep. of Korea

[73] Assignee: Goldstar Co., Ltd., Seoul, Rep. of Korea

[21] Appl. No.: 931,346

[22] Filed: Aug. 18, 1992

[30] Foreign Application Priority Data

Aug. 23, 1991 [KR] Rep. of Korea .............. 14639/1991

[51] Int. Cl.[5] ..................... H04N 5/78; H04N 9/491
[52] U.S. Cl. ..................... 358/335; 358/310; 360/3301; 360/27
[58] Field of Search ............... 358/310, 335, 330, 321, 358/338; 360/27, 33.1; H04N 5/782

[56] References Cited

U.S. PATENT DOCUMENTS

| | | | |
|---|---|---|---|
| 4,686,585 | 8/1987 | Sato | 358/310 |
| 4,786,986 | 11/1988 | Yamanushi et al. | 360/33.1 |
| 4,991,027 | 2/1991 | Enoki | 358/310 |
| 5,032,925 | 7/1991 | Ganse et al. | 358/310 |

Primary Examiner—Tommy P. Chin
Assistant Examiner—Huy Nguyen

[57] ABSTRACT

Apparatus and method for generating video picture adjustment signals in a VCR. The apparatus comprises a VCR head for detecting a video signal from a VCR tape, a double peaking and amplifying circuit for peaking and amplifying a luminance signal component of the detected video signal corresponding to a recording frequency band of a super tape to output a first peaked and amplified signal and peaking and amplifying a luminance signal component of the detected video signal corresponding to both the recording frequency band of the super tape and a recording frequency band of a normal tape to output a second peaked and amplified signal, first and second DC voltage converting circuits for converting the first and second peaked and amplified signals into first and second DC voltage signals, an adding circuit for adding the first and second DC voltage signals to obtain an automatic video picture tracking adjustment signal, a clamping circuit for clamping the added signal from the adding circuit at a predetermined voltage to obtain an automatic video picture sharpness adjustment signal, a first comparison circuit for obtaining an instruction signal for performance of a rental function, and a second comparison circuit for obtaining a signal for discriminating the type of the VCR tape.

20 Claims, 4 Drawing Sheets

F I G. 2
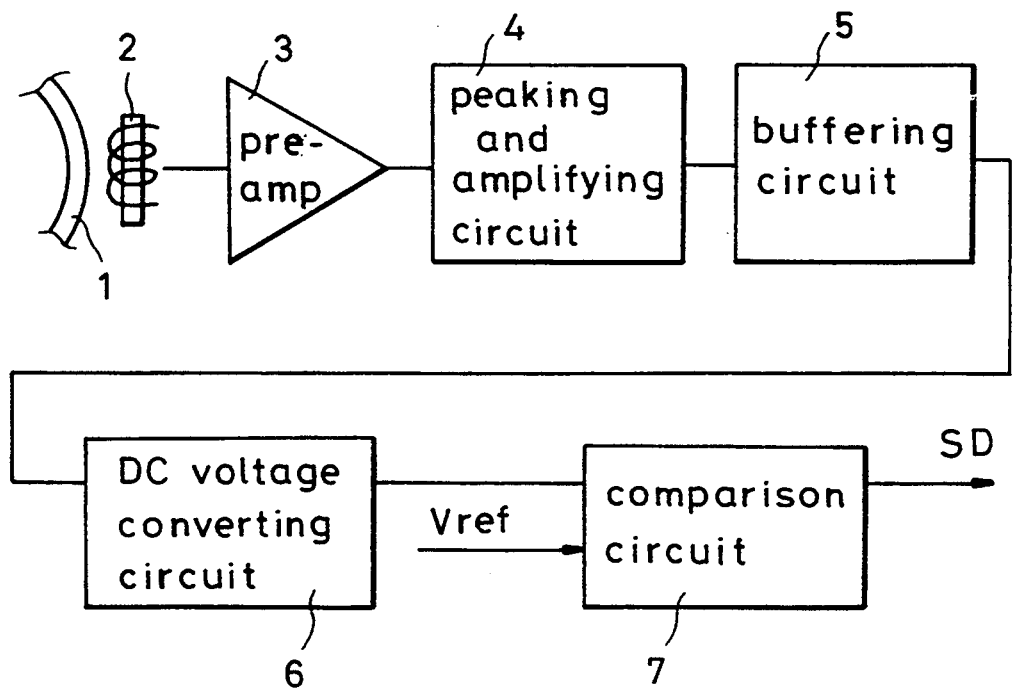

APPARATUS AND METHOD FOR GENERATING VIDEO PICTURE ADJUSTMENT SIGNALS IN VCR

BACKGROUND OF THE INVENTION

1. Field of the Invention

The present invention relates in general to a video cassette recorder (VCR), and more particularly to apparatus and method for generating video picture adjustment signals in a VCR, which can simultaneously provide a plurality of video picture adjustment signals, i.e., a signal for automatically discriminating the type of a VCR tape on which a video signal is recorded, a signal for automatically detecting a deteriorated state of the VCR tape, a signal for automatically adjusting sharpness of a video picture, and a signal for automatically adjusting tracking of the video picture.

2. Description of the Prior Art

VCR tapes of the VHS system are typically classified into the normal tape type and the super tape type. The normal and super tapes have a difference therebetween according to frequency bands over which energy levels of luminance signals of video signals recorded respectively thereon are distributed. Namely, as shown in FIG. 1, the recording energy level of the luminance signal of the video signal recorded on the normal tape is mostly distributed over the frequency band of 3.4 MHz–4.4 MHz and the recording energy level of the luminance signal of the video signal recorded on the super tape is mostly distributed over the frequency band of 5.4 MHz–7 MHz.

It can also be seen from FIG. 1 that both recording energy levels of chrominance signals of the video signals recorded respectively on the super and normal tapes are mostly distributed around a frequency of 629 KHz.

Since the normal and super tapes are used in common as the VCR tapes of the VHS system as mentioned above, video reproduction apparatus for VCRs of the VHS system have recently been provided to process video reproduction with respect to both the two types of VCR tapes. In the conventional VCR of the VHS system, the discrimination between the normal and super tapes is accomplished by a provision of tape sensing means disposed in the VCR mechanism for sensing a sensing hole provided on the super tape. Also, the conventional video reproduction apparatus for the VCR of the VHS system comprises separate circuits for adjusting tracking and sharpness of a video picture, respectively. With the separate circuits, the user must manually operate the tracking and sharpness of the video picture while watching a state of the video picture.

In the conventional VCR of the VHS system, as mentioned above, the discrimination between the types of the VCR tapes is accomplished by the mechanical sensing means. This has the effect of increasing the complexity of the VCR mechanism and thus the manufacturing cost thereof. Also, in the conventional video reproduction apparatus for the VCR of the VHS system, the separate circuits are provided to adjust the tracking and sharpness of the video picture and detect a deteriorated state of the VCR tape, respectively, resulting in increase in the manufacturing cost of the VCR mechanism. Further, since the user must manually operate the tracking and sharpness of the video picture with the separate circuits, inconvenience is caused.

SUMMARY OF THE INVENTION

Therefore, the present invention has been made in view of the above problems, and it is an object of the present invention to provide an apparatus for generating video picture adjustment signals in a VCR, which is capable of automatically discriminating the type of a VCR tape on which a video signal is recorded, i.e., automatically discriminating whether the VCR tape is a super tape or a normal tape, with not mechanical means but circuitry means.

It is another object of the present invention to provide an apparatus for generating video picture adjustment signals in a VCR, which is capable of simultaneously providing a plurality of video picture adjustment signals, i.e., a signal for automatically detecting a deteriorated state of a VCR tape, a signal for automatically adjusting sharpness of a video picture, and a signal for automatically adjusting tracking of the video picture.

It is still another object of the present invention to provide a method of generating video picture adjustment signals in a VCR, which is capable of simultaneously providing a plurality of video picture adjustment signals.

In accordance with one aspect of the present invention, there is provided an apparatus for generating video picture adjustment signals in a VCR, comprising: a VCR head for detecting a video signal from a VCR tape; peaking and amplifying means for peaking and amplifying a luminance signal component of the detected video signal from said VCR head corresponding to a recording frequency band of a super tape; DC voltage converting means for converting the peaked and amplified signal from said peaking and amplifying means into a DC voltage signal; and comparison means for comparing the DC voltage signal from said DC voltage converting means with a predetermined reference voltage signal and outputting a signal for discriminating whether the VCR tape is the super tape or a normal tape, as a result of the comparison.

In accordance with another aspect of the present invention, there is provided an apparatus for generating video picture adjustment signals in a VCR, comprising: a VCR head for detecting a video signal from a VCR tape; double peaking and amplifying means for peaking and amplifying a luminance signal component of the detected video signal from said VCR head corresponding to a recording frequency band of a super tape to output a first peaked and amplified signal and peaking and amplifying a luminance signal component of the detected video signal from said VCR head corresponding to both the recording frequency band of the super tape and a recording frequency band of a normal tape to output a second peaked and amplified signal; first DC voltage converting means for converting the first peaked and amplified signal from said double peaking and amplifying means into a first DC voltage signal; second DC voltage converting means for converting the second peaked and amplified signal from said double peaking and amplifying means into a second DC voltage signal; adding means for adding the first and second DC voltage signals from said first and second DC voltage converting means and outputting the added signal as an automatic video picture tracking adjustment signal; clamping means for clamping the added signal from said adding means at a predetermined voltage and outputting the added signal as an automatic video picture sharpness adjustment signal if a level of the added signal is lower than that of the predetermined voltage; first comparison means for comparing the added signal from said adding means with a predetermined first reference voltage signal to discriminate a deteriorated state of the VCR tape and outputting an instruction signal for performance of a rental function as a result of the comparison; and second comparison means for comparing the first DC voltage signal from said first DC voltage converting means with a predetermined second reference voltage signal and outputting a signal for discriminating the type of the VCR tape as a result of the comparison.

In accordance with still another aspect of the present invention, in a video reproduction apparatus for reproducing a video signal through a VCR head, there is provided a method of generating video picture adjustment signals in a VCR, comprising the steps of: detecting the video signal from a VCR tape through the VCR head; peaking and amplifying a luminance signal component of the detected video signal corresponding to a recording frequency band of a super tape to obtain a first peaked and amplified signal and peaking and amplifying a luminance signal component of the detected video signal corresponding to both the recording frequency band of the super tape and a recording frequency band of a normal tape to obtain a second peaked and amplified signal; converting the first and second peaked and amplified signals into first and second DC voltage signals; discriminating the type of the VCR tape on the basis of a level of the first DC voltage signal; adding the first and second DC voltage signals to obtain an automatic video picture tracking adjustment signal; clamping the automatic video picture tracking adjustment signal at a predetermined voltage to obtain an automatic video picture sharpness adjustment signal; and obtaining an instruction signal for performance of a rental function on the basis of a level of the automatic video picture tracking adjustment signal.

BRIEF DESCRIPTION OF THE DRAWINGS

The above and other objects, features and advantages of the present invention will be more clearly understood from the following detailed description taken in conjunction with the accompanying drawings, in which:

FIG. 2 is a block diagram of an apparatus for generating video picture adjustment signals in a VCR in accordance with an embodiment of the present invention;

DETAILED DESCRIPTION OF THE PREFERRED EMBODIMENTS

Figure 1:
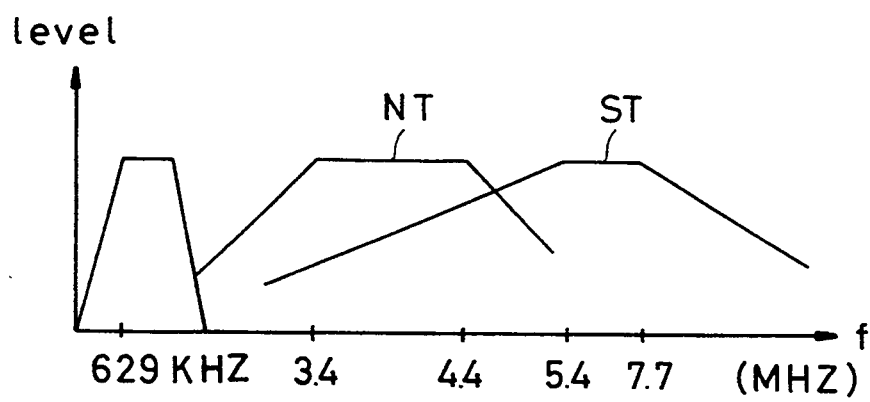
FIG. 1 is a distribution chart illustrating frequency bands over which recording energy levels of video signals recorded respectively on normal and super tapes are distributed.

Referring to FIG. 2, there is shown a block diagram of an apparatus for generating video picture adjustment signals in a VCR in accordance with an embodiment of the present invention. As shown in this figure, the apparatus of the present invention comprises a VCR head 2 for detecting a video signal from a VCR tape 1, a pre- amplifying circuit 3 for pre-amplifying the detected video signal from the VCR head 2 by a predetermined amplification degree, a peaking and amplifying circuit 4 for peaking and amplifying a luminance signal component of the pre-amplified video signal from the pre-amplifying circuit 3 corresponding to a recording frequency band of a super tape, a buffering circuit 5 for buffering the peaked and amplified signal from the peaking and amplifying circuit 4 to stabilize it, a DC voltage converting circuit 6 for converting the buffered signal from the buffering circuit 5 into a DC voltage signal, and a comparison circuit 7 for comparing the DC voltage signal from the DC voltage converting circuit 6 with a predetermined reference voltage signal Vref and outputting a signal SD for discriminating the type of the VCR tape as a result of the comparison.

Figure 3:
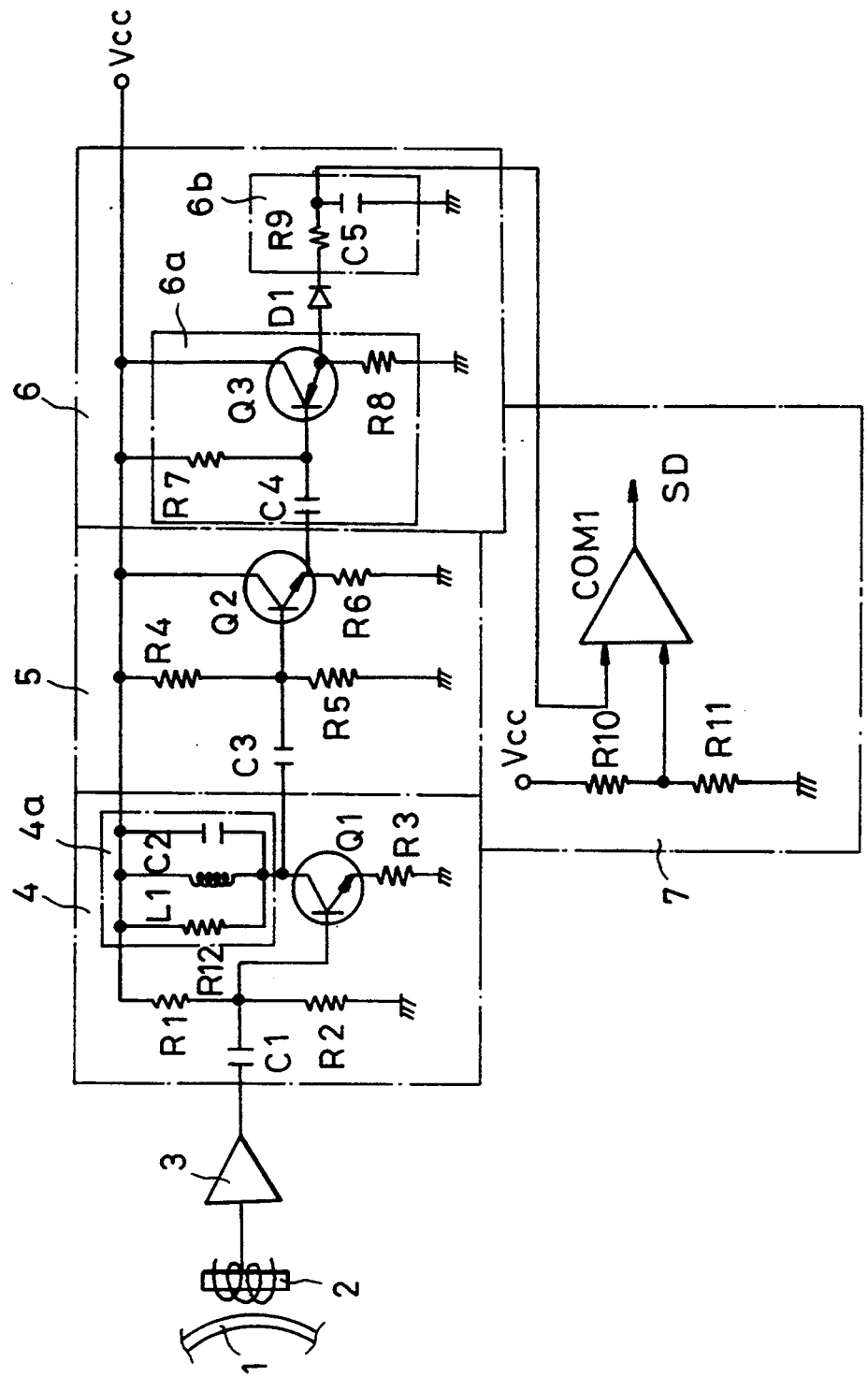
FIG. 3 is a detailed circuit diagram of the apparatus in FIG. 2.

Referring to FIG. 3, there is shown a detailed circuit diagram of the apparatus in FIG. 2. As shown in the drawing, the peaking and amplifying circuit 4 includes a DC coupling capacitor C1, a NPN-type transistor Q1 functioning as an amplifier, resistors R1 and R2 for determining a bias to the NPN-type transistor Q1, and a resonance circuit 4a connected to the collector of the NPN-type transistor Q1, for peaking the luminance signal component corresponding to the recording frequency band of the super tape. The resonance circuit 4a is provided with a resistor R3, a coil L1 and a capacitor C2.

The buffering circuit 5 includes a NPN-type transistor Q2 for buffering, resistors R4 and R5 for determining a bias to the NPN-type transistor Q2, a DC coupling capacitor C3 and an output resistor R6 for the NPN-type transistor Q2.

The DC voltage converting circuit 6 includes a current controller 6a, a rectifying diode D1 and a smoothing circuit 6b. The current controller 6a is provided with a DC coupling capacitor C4, a PNP-type transistor Q3 for control of current, a resistor R7 for determining a bias to the PNP-type transistor Q3 and an output resistor R8 for the PNP-type transistor Q3. The smoothing circuit 6b is provided with a resistor R9 and a capacitor C5.

The comparison circuit 7 includes a comparator COM1 and resistors R10 and R11 for determining a level of the reference voltage signal Vref of the comparator COM1.

Now, the operation of the apparatus with the above-mentioned construction in accordance with the embodiment of the present invention will be described in detail.

In operation, the video signal from the VCR tape 1 is detected by the VCR head 2, which then applies the detected video signal to the pre-amplifying circuit 3. In the pre-amplifying circuit 3, the detected video signal is pre-amplified by the predetermined amplification degree and then applied to the peaking and amplifying circuit 4. In the peaking and amplifying circuit 4, the resonance circuit 4a peaks the luminance signal component of the pre-amplified video signal corresponding to one of the recording frequency bands shown in FIG. 1, in which the peak recording energy level of the super tape is present. The peaked signal is amplified by the transistor Q1.

The peaked and amplified signal from the peaking and amplifying circuit 4 is transferred through the buffering circuit 5 to the DC voltage converting circuit 6. In the DC voltage converting circuit 6, the current controller 6a outputs an AC current signal to the diode D1, a value of which is controlled according to a level of the output signal from the buffering circuit. The diode D1 rectifies the received AC current signal and then applies the rectified current signal to the smoothing circuit 6b, which converts the rectified current signal into a DC voltage signal in which a ripple component is reduced.

In the comparison circuit 7, the comparator COM1 compares the DC voltage signal from the DC voltage converting circuit 6 with the reference voltage signal Vref, the level of which is determined by the resistors R10 and R11. As a result of the comparison, outputted as the signal SD from the comparator COM1 is a high signal corresponding to the super tape if a level of the DC voltage signal from the DC voltage converting circuit 6 is higher than that of the reference voltage signal Vref, while a low signal corresponding to a normal tape if not so.

Figure 4:
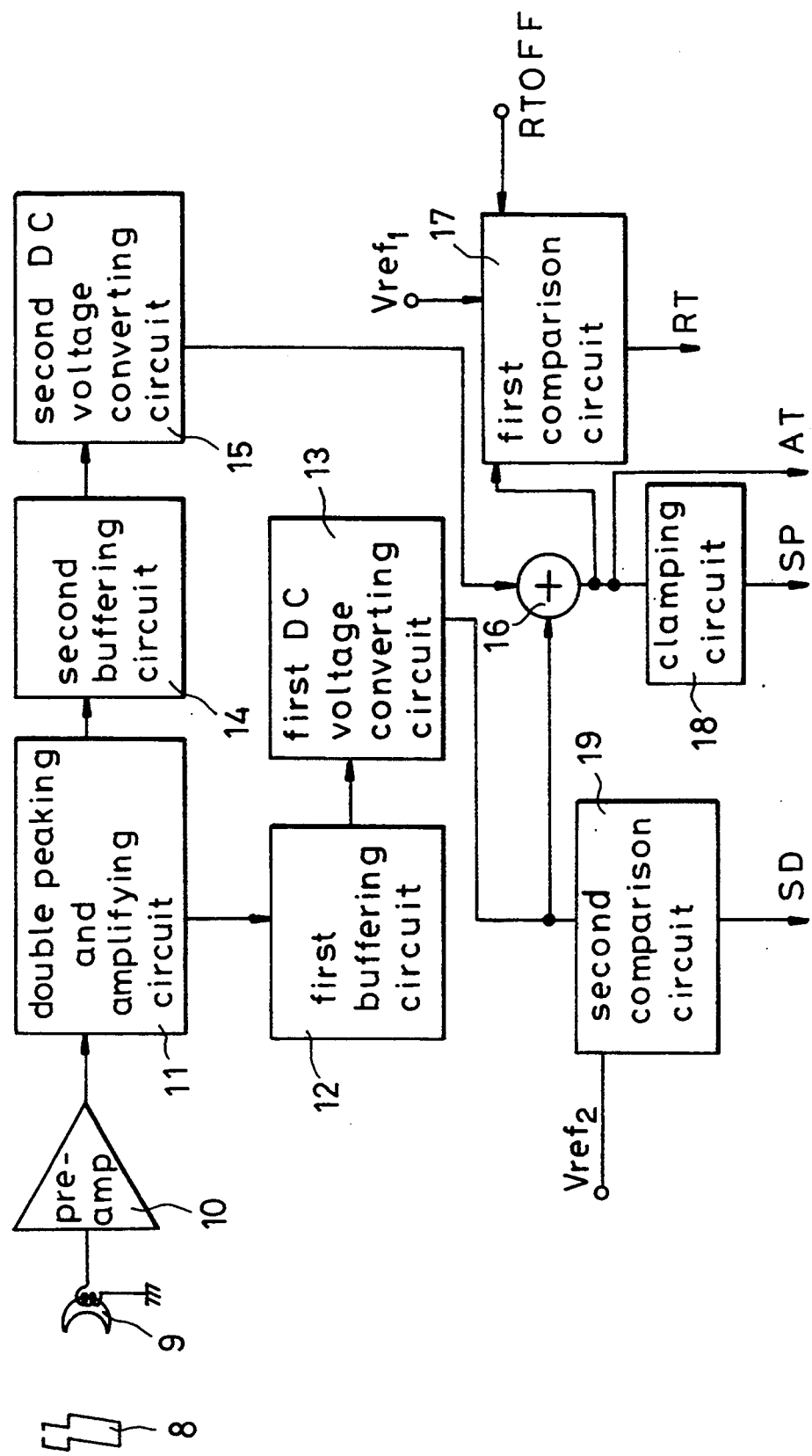
FIG. 4 is a block diagram of an apparatus for generating video picture adjustment signals in a VCR in accordance with an alternative embodiment of the present invention.

Referring to FIG. 4, there is shown a block diagram of an apparatus for generating video picture adjustment signals in a VCR in accordance with an alternative embodiment of the present invention. As shown in this figure, the apparatus of the present invention comprises a VCR head 9 for detecting a video signal from a VCR tape 8, a pre-amplifying circuit 10 for pre-amplifying the detected video signal from the VCR head 9 by a predetermined amplification degree, a double peaking and amplifying circuit 11 for peaking and amplifying a luminance signal component of the pre-amplified video signal from the pre-amplifying circuit 10 corresponding to a recording frequency band of a super tape to output a first peaked and amplified signal P1 and peaking and amplifying a luminance signal component of the pre-amplified video signal from the pre-amplifying circuit 10 corresponding to both the recording frequency band of the super tape and a recording frequency band of a normal tape to output a second peaked and amplified signal P2, a first buffering circuit 12 for buffering the first peaked and amplified signal P1 from the double peaking and amplifying circuit 11 to stabilize it, a first DC voltage converting circuit 13 for converting the buffered signal from the first buffering circuit 12 into a first DC voltage signal, a second buffering circuit 14 for buffering the second peaked and amplified signal P2 from the double peaking and amplifying circuit 11 to stabilize it, and a second DC voltage converting circuit 15 for converting the buffered signal from the second buffering circuit 14 into a second DC voltage signal.

Also, the apparatus of the present invention comprises an adding circuit 16 for adding the first and second DC voltage signals from the first and second DC voltage converting circuits 13 and 15 and outputting the added signal as an automatic video picture tracking adjustment signal AT, a first comparison circuit 17 for comparing the added signal from the adding circuit 16 with a predetermined first reference voltage signal Vref1 and outputting an instruction signal RT for performance of a rental function as a result of the comparison, a clamping circuit 18 for clamping the added signal from the adding circuit 16 at a predetermined voltage and outputting the added signal as an automatic video picture sharpness adjustment signal SP if a level of the added signal is lower than that of the predetermined voltage, and a second comparison circuit 19 for comparing the first DC voltage signal from the first DC voltage converting circuit 13 with a predetermined second reference voltage signal Vref2 and outputting a signal SD for discriminating the type of the VCR tape as a result of the comparison. Herein, the first comparison circuit 17 further includes a compulsory rental function off terminal RTOFF for providing a signal for stopping the performance of the rental function by compulsion.

Figure 5:
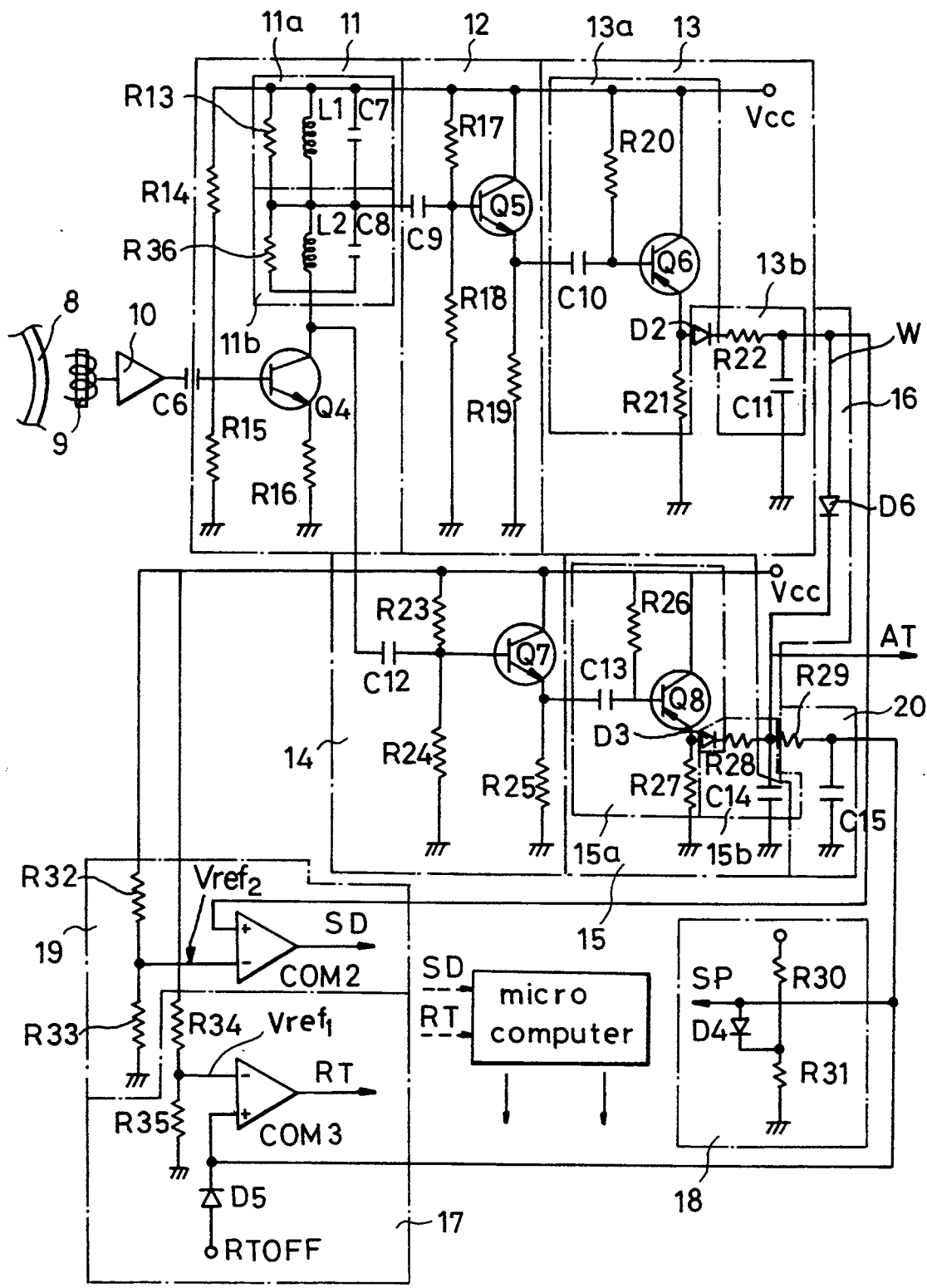
FIG. 5 is a detailed circuit diagram of the apparatus in FIG. 4.

Referring to FIG. 5, there is shown a detailed circuit diagram of the apparatus in FIG. 4. As shown in this drawing, the double peaking and amplifying circuit 11 includes a DC coupling capacitor C6, a NPN-type transistor Q4 functioning as an amplifier, resistors R14 and R15 for determining a bias to the NPN-type transistor Q4, a first resonance circuit 11a for peaking the luminance signal component corresponding to the recording frequency band of the super tape, a second resonance circuit 11b for peaking the luminance signal component corresponding to the recording frequency band of the normal tape, and an output resistor R16 for the NPN-type transistor Q4. The first resonance circuit 11a is provided with a resistor R13, a coil L2 and a capacitor C7 and the second resonance circuit 11b is provided with a resistor R36, a coil L3 and a condenser C8.

In FIG. 5, the constructions and operations of the first and second buffering circuits 12 and 14, the first and second DC voltage converting circuits 13 and 15 and the second comparison circuit 19 in the alternative embodiment of the present invention are the same as those of the buffering circuit 5, the DC voltage converting circuit 6 and the comparison circuit 7 in the first embodiment as mentioned previously and a description thereof will thus be omitted.

The adding circuit 16 includes a line W for connecting in series the output of the smoothing circuit 13b in the first DC voltage converting circuit 13 and the output of the smoothing circuit 15b in the second DC voltage converting circuit 15 and a rectifying diode D6 disposed on the line W. A smoothing circuit 20 is further provided at the output of the adding circuit 16 to remove a ripple component from the output signal from the adding circuit 16. The smoothing circuit 20 is provided with a resistor R29 and a condenser C15.

The clamping circuit 18 includes a diode D4 and resistors R30 and R31. The clamping circuit 18 outputs a signal as the automatic video picture sharpness adjustment signal SP, the level of which is lower than a voltage level obtained by adding a voltage across the diode D4 and a voltage across the resistor R31.

The first comparison circuit 17 includes a comparator COM3 for inputting the output signal from the smoothing circuit 20 at its non-inverting input terminal and the first reference voltage signal Vref1 at its inverting input terminal, resistors R34 and R35 for determining a level of the first reference voltage signal Vref1, and the compulsory rental function off terminal RTOFF for applying the compulsory rental function off signal to the non-inverting input terminal of the comparator COM3.

The operation of the apparatus with the above-mentioned construction in accordance with the alternative embodiment of the present invention will hereinafter be described in detail.

As stated previously with reference to FIG. 1, the recording energy level of the luminance signal of the video signal recorded on the normal tape is mostly distributed over the frequency band of 3.4 MHz–4.4 MHz and the recording energy level of the luminance signal of the video signal recorded on the super tape is mostly distributed over the frequency band of 5.4 MHz–7 MHz.

In operation, the video signal from the VCR tape 8 is detected by the VCR head 9, which then applies the detected video signal to the pre-amplifying circuit 10. In the pre-amplifying circuit 10, the detected video signal is pre-amplified by the predetermined amplification degree and then applied to the double peaking and amplifying circuit 11. In the double peaking and amplifying circuit 11, the first resonance circuit 11a peaks the luminance signal component of the pre-amplified video signal corresponding to the recording frequency band of the super tape. Also, the second resonance circuit 11b peaks the luminance signal component of the pre-amplified video signal corresponding to the recording frequency band of the normal tape. As a result, the first peaked and amplified signal P1 is generated by the cooperation of the first resonance circuit 11a and the transistor Q4 and the second peaked and amplified signal P2 is generated by the cooperation of the first and second resonance circuits 11a and 11b and the transistor Q4. In other words, the second peaked and amplified signal P2 is generated upon the presence of any video signal recorded on the VCR tape, regardless of the recording frequency bands of the super and normal tapes.

The first and second peaked and amplified signals P1 and P2 from the double peaking and amplifying circuit 11 are transferred respectively through the first and second buffering circuits 12 and 14 to the first and second DC voltage converting circuits 13 and 15, which convert the inputted signals into the first and second DC voltage signals, respectively. Noticeably, the first DC voltage signal is a voltage signal regrading the luminance signal component of the video signal corresponding to the recording frequency band (5.4 MHz–7 MHz) over which the peak recording energy level of the super tape is distributed, and the second DC voltage signal is a voltage signal regarding the luminance signal component which is obtained upon the presence of any video signal recorded on the VCR tape, regardless of the recording frequency bands of the super and normal tapes. In other words, in the first and second DC voltage converting circuits 13 and 15, the current controllers 13a and 15a output AC current signals to the diodes D2 and D3, respectively, the values of which are controlled respectively in proportion to levels of the buffered first and second peaked and amplified signals from the first and second buffering circuits 12 and 14. The diodes D2 and D3, respectively, rectify the received AC current signals and then apply the rectified current signals to the smoothing circuits 13b and 15b, which convert the rectified current signals into the first and second DC voltage signals.

The first DC voltage signal from the smoothing circuit 13b is applied to the non-inverting input terminal of the comparator COM2 in the second comparison circuit 19 for comparison with the second reference voltage signal Vref2 at the inverting input terminal of the comparator COM2. As a result of the comparison, outputted as the signal SD from the comparator COM2 is a high signal corresponding to the super tape if a level of the first DC voltage signal is higher than that of the second reference voltage signal Vref2, while a low signal corresponding to the normal tape if not so. The signal SD from the comparator COM2 is transferred to a microcomputer as system control means. In response to the signal SD, the microcomputer controls the video picture of the VCR. Such VCR video picture control function using the microcomputer is well known in the art and a description thereof will thus be omitted.

On the other hand, the adding circuit 16 acts to add the first and second DC voltage signals from the first, and second DC voltage converting circuits 13 and 15, together. The output signal from the adding circuit 16 is utilized as the automatic video picture tracking adjustment signal AT. Herein, the diode D6 in the adding circuit 16 performs a rectifying function for addition of only plus component of the first DC voltage signal to the second DC voltage signal. As mentioned above, the smoothing circuit 20 acts to remove a ripple component from the output signal from the adding circuit 16. Then, the output signal from the adding circuit 16 smoothed in the smoothing circuit 20 is clamped at the predetermined voltage in the clamping circuit 18. The predetermined voltage in the clamping circuit 18 is obtained by adding together the voltage across the diode D4 in the clamping-circuit 18 and the voltage across the resistor R31 therein. As a result, the clamping circuit 18 outputs a signal as the automatic video picture sharpness adjustment signal SP, the level of which is lower than that of the predetermined voltage.

Also, the output signal from the adding circuit 16 smoothed in the smoothing circuit 20 is applied to the non-inverting input terminal of the comparator COM3 in the first comparison circuit 17 for comparison with the first reference voltage signal Vref1 at the inverting input terminal of the comparator COM3. It is noted that the first reference voltage signal Vref1 is a reference signal for discrimination of a deteriorated state of the VCR tape. In other words, if a level of the output signal from the adding circuit 16 is lower than that of the first reference voltage signal Vref1 as a result of the comparison, it is then discriminated that the deteriorated state of the VCR tape is severe. For the purpose of compensation for such deteriorated state of the VCR tape, the first comparator 17 outputs a low signal as the instruction signal RT for performance of the rental function to the microcomputer as the system control means. If not so, the first comparison circuit 17 outputs a high signal as the instruction signal RT for performance of the rental function to the microcomputer. Upon receiving the high signal from the first comparison circuit 17, the microcomputer performs no rental function.

As mentioned above, the first comparison circuit 17 further includes the compulsory rental function off terminal RTOFF for applying the compulsory rental function off signal to the non-inverting input terminal of the comparator COM3 therein. The compulsory rental function off terminal RTOFF is used in a case where the user would like to watch the video picture of the VCR while maintaining the deteriorated state of the VCR tape naturally with no use of the rental function. This case is achieved by manually operating the compulsory rental function off terminal RTOFF. Namely, if the user manually operates the compulsory rental function off terminal RTOFF to achieve such case, a signal of level higher than that of the first reference voltage signal Vref1 is applied from the compulsory rental function off terminal RTOFF to the non-inverting input terminal of the comparator COM3 in the first comparison circuit 17. As a result, a high signal from the first comparison circuit 17 is applied to the microcomputer, so that the microcomputer performs no rental function.

As hereinbefore described, the present invention can provide the following advantages.

First, the VCR is capable of automatically discriminating the type of the VCR tape by virtue of the circuitry means contained therein with no separate hole sensing means which has been provided in the prior art to sense the sensing hole on the super tape for the discrimination between the types of the VCR tapes. This is achieved by utilizing the frequency bands over which the recording energy levels of the VCR tapes are respectively distributed. This has the effect of reducing the complexity of the VCR mechanism and thus the manufacturing cost thereof.

Second, the VCR is capable of automatically performing the video picture sharpness and tracking adjustments and the rental function depending on the deteriorated state of the video picture which have manually been performed by the user while the video picture being watched by the user in the prior art. This is achieved by converting the video signal recorded on the VCR tape into the DC voltage signal in proportion to its level and utilizing the linearity of the DC voltage signal. This results in decrease in the manufacturing cost of the VCR mechanism and convenience in use.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for generating video picture adjustment signals in a VCR, comprising:
   a VCR head for detecting a video signal from a VCR tape;
   double peaking and amplifying means for peaking and amplifying a luminance signal component of the detected video signal from said VCR head corresponding to a recording frequency band of a super tape to output a first peaked and amplified signal and peaking and amplifying a luminance signal component of the detected video signal from said VCR head corresponding to both the recording frequency band of the super tape and a recording frequency band of a normal tape to output a second peaked and amplified signal;
   first DC voltage converting means for converting the first peaked and amplified signal from said double peaking and amplifying means into a first DC voltage signal;
   second DC voltage converting means for converting the second peaked and amplified signal from said double peaking and amplifying means into a second DC voltage signal;
   third signal means for forming a third signal as a function of the first and second DC voltage signals from said first and second DC voltage converting means and outputting the third signal as an automatic video picture tracking adjustment signal;
   clamping means for clamping the third signal from said third signal means at a predetermined voltage and outputting the third signal as an automatic video picture sharpness adjustment signal if a level of the third signal is lower than that of the predetermined voltage;
   first comparison means for comparing the third signal from said third signal means with a predetermined first reference voltage signal to discriminate a deteriorated state of the VCR tape and outputting a signal indicating a deterioration state of the VCR tape; and
   second comparison means for comparing the first DC voltage signal from said first DC voltage converting means with a predetermined second reference voltage signal and outputting a signal for discriminating the type of the VCR tape as a result of the comparison.

2. An apparatus for generating video picture adjustment signals in a VCR, as set forth in claim 1, further comprising:
   pre-amplifying means disposed between said VCR head and said double peaking and amplifying means for pre-amplifying the detected video signal from said VCR head by a predetermined amplification degree.

3. An apparatus for generating video picture adjustment signals in a VCR, as set forth in claim 1, further comprising:
   first buffering means disposed between said double peaking and amplifying means and said first DC voltage converting means for buffering the first peaked and amplified signal from said double peaking and amplifying means to stabilize it; and
   second buffering means disposed between said double peaking and amplifying means and said second DC voltage converting means for buffering the second peaked and amplified signal from said double peaking and amplifying means to stabilize it.

4. An apparatus for generating video picture adjustment signals in a VCR, as set forth in claim 1, further comprising:
   a smoothing circuit disposed at the output of said third signal means for removing a ripple component from the third signal from said third signal means.

5. An apparatus for generating video picture adjustment signals in a VCR, as set forth in claim 1, wherein said double peaking and amplifying means includes:
   an amplifier device;
   a bias circuit for determining a bias to said amplifier device;
   a first resonance circuit connected to the output of said amplifier device, said first resonance circuit being peaked with the recording frequency band of the super tape; and
   a second resonance circuit connected in series to said first resonance circuit, said second resonance circuit being peaked with the recording frequency band of the normal tape.

6. An apparatus for generating video picture adjustment signals in a VCR, as set forth in claim 5, wherein said amplifier device is a NPN-type transistor.

7. An apparatus for generating video picture adjustment signals in a VCR, as set forth in claim 5, wherein said first and second resonance circuit each includes a resistor, a coil and a capacitor.

8. An apparatus for generating video picture adjustment signals in a VCR, as set forth in claim 1, wherein said first and second DC voltage converting means, respectively, include:
   current controllers for outputting AC current signals, respectively, values of which are controlled respectively according to levels of the first and second peaked and amplified signals from said double peaking and amplifying means;
   rectifying diodes for rectifying the AC current signals from said current controllers, respectively; and
   smoothing circuits for smoothing the rectified current signals from said rectifying diodes to output the first and second DC voltage signals, respectively.

9. An apparatus for generating video picture adjustment signals in a VCR, as set forth in claim 8, wherein said current controllers each includes:
   an amplifier device; and
   a bias circuit for determining a bias to said amplifier device.

10. An apparatus for generating video picture adjustment signals in a VCR, as set forth in claim 9, wherein said amplifier devices are PNP-type transistors.

11. An apparatus for generating video picture adjustment signals in a VCR, as set forth in claim 3, wherein said first and second buffering means each includes:
   an amplifier device; and
   a bias circuit for determining a bias to said amplifier device.

12. An apparatus for generating video picture adjustment signals in a VCR, as set forth in claim 11, wherein said amplifier devices are NPN-type transistors.

13. An apparatus for generating video picture adjustment signals in a VCR, as set forth in claim 1, wherein said first comparison means includes:
   a first reference signal generation circuit for generating the predetermined first reference voltage signal; and
   a comparator for comparing the third signal from said third signal means with the predetermined first reference voltage signal to discriminate the deterioration state of the VCR tape.

14. An apparatus for generating video picture adjustment signals in a VCR, as set forth in claim 3, wherein said first comparison means further includes:
   a compulsory type deterioration determination off terminal for providing said comparator with a signal for inhibiting said determination of a deteriorated state of the VCR tape.

15. An apparatus for generating video picture adjustment signals in a VCR, as set forth in claim 1, wherein said second comparison means includes:
   a second reference signal generation circuit for generating the second predetermined reference voltage signal; and
   a comparator for comparing the first DC voltage signal from said first DC voltage converting means with the predetermined second reference voltage signal and outputting the signal for discrimination of the type of the VCR tape as a result of the comparison.

16. An apparatus for generating video picture adjustment signals in a VCR as in claim 1, wherein:
   said third signal means forms said third signal as a function of adding said first and second DC voltage signals.

17. In a video reproduction apparatus for reproducing a video signal through a VCR head, a method of generating video picture adjustment signals in a VCR, comprising the steps of:
   detecting the video signal from a VCR tape through the VCR head;
   peaking and amplifying a luminance signal component of the detected video signal corresponding to a recording frequency band of a super tape to obtain a first peaked and amplified signal and peaking and amplifying a luminance signal component of the detected video signal corresponding to both the recording frequency band of the super tape and a recording frequency band of a normal tape to obtain a second peaked and amplified signal;
   converting the first and second peaked and amplified signals into first and second DC voltage signals;
   discriminating the type of the VCR tape on the basis of a level of the first DC voltage signal;
   adding the first and second DC voltage signals to obtain an automatic video picture tracking adjustment signal;
   clamping the automatic video picture tracking adjustment signal at a predetermined voltage to obtain an automatic video picture sharpness adjustment signal; and
   determining a deterioration state of the VCR tape as a function of a level of the automatic video picture tracking adjustment signal.

18. A method of generating video picture adjustment signals in a VCR, as set forth in claim 17, the first peaked and amplified signal is obtained by peaking and amplifying the luminance signal component of the detected video signal corresponding to the recording frequency band of 5.4 MHz–7 MHz and the second peaked and amplified signal is obtained by peaking and amplifying the luminance signal component of the detected video signal corresponding to both the recording frequency bands of 5.4 MHz–7 MHz and 3.4 MHz–4.4 MHz.

19. In a video reproduction apparatus for reproducing a video signal through a VCR head, a method of generating video picture adjustment signals in a VCR, comprising the steps of:
   detecting the video signal from a VCR tape through the VCR head;
   determining a first peaked and amplified signal corresponding to a recording frequency band of a super tape type of VCR tape and a second peaked and amplified signal corresponding to both the recording frequency band of the super tape and a recording frequency band of a normal tape type of VCR tape;
   converting the first and second peaked and amplified signals into first and second DC voltage signals;
   forming a third signal as a function of said first and second DC voltage signals,
      said third signal is formed as a function of adding said first and second DC voltage signals together; and
   generating at least one of a video picture sharpness adjustment signal, video picture tracking adjustment signal, and a video tape deterioration state signal as a function of said third signal,
      said video picture sharpness adjustment signal is formed as a function of clamping said third signal at a predetermined level.

20. In a video reproduction apparatus for reproducing a video signal through a VCR head, a method of generating video picture adjustment signals in a VCR, comprising the steps of:
   detecting the video signal from a VCR tape through the VCR head;
   determining a first peaked and amplified signal corresponding to a recording frequency band of a super tape type of VCR tape and a second peaked and amplified signal corresponding to both the recording frequency band of the super tape and a recording frequency band of a normal tape type of VCR tape;
   converting the first and second peaked and amplified signals into first and second DC voltage signals;

forming a third signal as a function of said first and second DC voltage signals; and
generating at least one of a video picture sharpness adjustment signal, video picture tracking adjustment signal, and a video tape deterioration state signal as a function of said third signal,
said video tape deterioration state signal is formed as a function of comparing said third signal against a predetermined reference.

* * * * *